United States Patent [19]
Ward et al.

[11] Patent Number: 4,801,419
[45] Date of Patent: Jan. 31, 1989

[54] SOLID PHASE DEFORMATION OF THERMOPLASTIC TUBES

[75] Inventors: Ian M. Ward, Leeds; Alan Selwood, Harrogate, both of England

[73] Assignee: National Research Development Corporation, London, England

[21] Appl. No.: 885,804

[22] Filed: Jul. 15, 1986

Related U.S. Application Data

[63] Continuation of Ser. No. 717,840, Mar. 29, 1985, abandoned.

[30] Foreign Application Priority Data

| Mar. 30, 1984 | [GB] | United Kingdom | 8408336 |
| Aug. 24, 1984 | [GB] | United Kingdom | 8421520 |
| Mar. 5, 1985 | [GB] | United Kingdom | 8505551 |

[51] Int. Cl.⁴ ............................................. B29C 55/30
[52] U.S. Cl. .................................. 264/288.4; 264/292; 425/393
[58] Field of Search ............... 264/127, 292, 323, 280, 264/209.5, 288.4; 425/393

[56] References Cited

U.S. PATENT DOCUMENTS

| 2,249,004 | 7/1941 | Kahn et al. | 18/5 |
| 2,863,174 | 12/1958 | Schuman et al. | 264/323 |
| 3,089,187 | 5/1963 | Wolfe | 18/14 |
| 3,356,108 | 12/1967 | Johnston | 264/127 |
| 3,364,294 | 1/1968 | Garibian et al. | 264/290 |
| 4,238,538 | 12/1980 | Manwiller | 264/323 |
| 4,250,138 | 2/1981 | Okita | 264/127 |
| 4,282,277 | 8/1981 | Austen et al. | 428/36 |
| 4,482,516 | 11/1984 | Bowman et al. | 264/127 |

FOREIGN PATENT DOCUMENTS

| 0133355 | 2/1985 | European Pat. Off. |
| 1211790 | 10/1955 | Fed. Rep. of Germany |
| 322558 | 6/1902 | France |
| 57-31426 | 2/1982 | Japan |
| 58-67411 | 4/1983 | Japan |
| 1456222 | 11/1972 | United Kingdom |
| 2060469 | 5/1981 | United Kingdom |

*Primary Examiner*—James Lowe
*Attorney, Agent, or Firm*—Finnegan, Henderson, Farabow, Garrett, and Dunner

[57] ABSTRACT

A process for the deformation of a hollow workpiece comprising orientable, thermoplastic polymer by passage in the solid phase through a die having both an entry side and an exit side, which process comprises providing the hollow workpiece at the entry side of the die; applying to the hollow workpiece from the exit side of the die a tension insufficient to cause tensile failure of the workpiece but sufficient to deform the hollow workpiece by drawing it with reduction in its bulk cross-sectional area in the solid phase simultaneously through the die and over an internally positioned former having a cross-sectional area greater than the initial internal cross-sectional area of the hollow workpiece; and collecting the deformed hollow workpiece from the exit side of the die.

25 Claims, 3 Drawing Sheets

SOLID PHASE DEFORMATION OF THERMOPLASTIC TUBES

This application is a continuation of application Ser. No. 717,840 filed Mar. 29, 1985 and now abandoned.

BACKGROUND OF THE INVENTION

This invention relates to tubular materials; more particularly, this invention relates to a process for the solid phase deformation of tubular materials of an orientable, thermoplastic polymer and to the oriented tubular materials so produced.

In our patent GB No. 2060469B we have described a process for the solid phase deformation of a workpiece of an orientable, thermoplastic polymer, which process comprises providing the workpiece of the essentially unoriented polymer at the entry side of a die; applying to the workpiece from the exit side of the die a draw tension insufficient to cause tensile failure of the workpiece; and drawing the workpiece through the die so that its plastic strain is progressively increased during start-up of the process.

This invention seeks to provide oriented tubular materials having improved mechanical properties, especially in directions other than the machine direction.

SUMMARY OF THE INVENTION

According to the present invention, there is provided a process for the deformation of a hollow workpiece comprising an orientable, thermoplastic polymer by passage in the solid phase through a die having both an entry side and an exit side, which process comprises providing the hollow workpiece at the entry side of the die; applying to the hollow workpiece from the exit side of the die a tension insufficient to cause tensile failure of the workpiece but sufficient to deform the hollow workpiece by drawing it with reduction in its bulk cross-sectional area in the solid phase simultaneously through the die and over an internally positioned former having a cross-sectional area greater than the initial internal cross-sectional area of the hollow workpiece; and collecting the deformed hollow workpiece from the exit side of the die.

DESCRIPTION OF THE PREFERRED EMBODIMENTS

By "bulk cross-sectional area" of the hollow workpiece is meant the area of the bulk of the workpiece substantially normal to the machine direction; by "internal cross-sectional area" of the hollow workpiece is meant the area of the hollow within the workpiece substantially normal to the machine direction. By way of example, in a tubular workpiece, the former area is $\pi/4(D_o^2-D_B^2)$ where $D_o$ is the outside diameter and $D_B$ is the bore of the tubular workpiece while the other area is $\pi_4 D_B^2$.

The process of the present invention is effected by utilising at the die and, optionally, downstream therefrom a former internally positioned within the hollow workpiece and having a cross-sectional area of at least the initial internal cross-sectional area of the hollow workpiece and, preferably, the same cross-section. Preferably the cross-sectional area of the former is greater than the initial internal cross-sectional area of the hollow workpiece and this may advantageously be provided by a former of progressively increasing cross-sectional area.

The term "hollow workpiece" as used herein includes tubes and other cross-sections of hollow stock. The term includes both billets and other forms of stock of greater length; indeed, continous stock, which may be formed as the process is performed, may be utilised. Examples include open-ended elongate workpieces of substantially constant cross-section, desirably with an axis of symmetry; for example, hollow workpieces of circular, elliptical, square, rectangular or triangular cross-section.

The orientable thermoplastic polymer desirably is or becomes a semicrystalline polymer, especially one which exhibits sufficient strain hardening and strain rate dependence of the flow stress to stabilise the neck formed under the desired drawing conditions. Preferred classes of such polymers are unsubstituted or mono- or poly- halo-, for example chloro- or fluoro- substituted vinyl polymers, unsubstituted or hydroxy-substituted polyesters, polyamides, polyetherketones and polyacetals. Suitable examples include a linear homo- or copolymer of ethylene or propylene with at least one comonomer; a vinyl chloride polymer, a vinyl fluoride polymer or a vinylidene fluoride polymer; PHB; PEEK; or a homo- or co-polyoxysethylene.

The polyester is one which is derivable from the reaction of at least one polyhydric alcohol, suitably a linear polyhydric alcohol, preferably a diol, with at least one polybasic acid, suitably a polycarboxylic acid. The alcohol is preferably an alicyclic or aliphatic such alcohol; for example, cyclohexanedimethanol or a linear $C_2$ to $C_6$ alkylene diol such as ethylene glycol, 1,3-propylene glycol or 1,4-butylene glycol, especially ethylene glycol. The acid is preferably an aromatic, alicyclic or aliphatic such acid; for example a mono- or poly carbocyclic aromatic acid such as o, m-, or terephthalic acid; 2,6- or 1,5-naphthalene dicarboxylic acid; or 1,2-dihydroxybenzoic acid, especially terephthalic acid. Examples of suitable polyesters include polyethylene 2,6-naphthalate, polyethylene 1,5-naphthalate, polytetramethylene 1,2-dihydroxybenzoate, polyethylene terephthalate, polybutylene terephthalate and copolyesters, especially of ethylene terephthalate.

Where it is intended to utilise the die drawing process of this invention to produce a product with enhanced Young's modulus; resistance to creep; resistance to gas transport; enhanced deadfold; or enhanced axial thermal conductivity then a workpiece of a linear homo- or copolymer of ethylene should desirably comprise a polymer having a weight average molecular weight ($\overline{M}_w$) less than 1,000,000, suitably from 50,000 to 500,000, preferably from 70,000 to 400,000; one of a linear homo- or copolymer of propylene should desirably comprise a polymer having a $\overline{M}_w$ from 150,000 to 800,000, preferably from 250,000 to 500,000.

However, the die drawing process of this invention may also be performed, to provide a more advantageous forming process but not the enhanced properties listed above, on a hollow workpiece of an orientable, amorphous polymer: for example polymethyl methacrylate or polystyrene; or of an orientable, semicrystalline ultra high molecular weight polymer (for example, a linear homopolymer of ethylene having a $\overline{M}_w$ about 3,000,000). It may likewise be utilised, but to a lower deformation ratio, in respect of those polymers which would otherwise give the enhanced properties lised above.

The hollow workpieces used in the process of this invention may incorporate a filler. Examples of useful fibrous fillers include glass, asbestos, metal, carbon and ceramic whiskers, such as those formed from silicon carbide. Examples of useful laminar fillers include mica, talc and graphite flakes. Chalk and fly ash may also be included. The amount of filler which may advantageously be included depends on the nature of the filler, but up to 50% by weight, preferably less than 30%, especially less than 20%, may be incorporated.

The hollow workpiece may be essentially unoriented before deformation. The term "essentially unoriented" as used herein means that the hollow workpiece has incurred no orientation other than that minor amount which might be induced during formation of the workpiece, (including orientation produced in the semi-molten state) for example during billet moulding or melt extrusion, or during any subsequent shaping thereof, for example by machining, prior to the performance of the die drawing process of this invention.

Where it is not possible to use the polymer as received as a hollow workpiece, the workpiece may be formed either in the batch or continuously. In either case care must be taken to ensure that the workpiece cools at an appropriate rate so that the resulting hollow workpiece will be without defects.

In the case of a hollow workpiece formed in the batch, for example a polymer billet, the following general methods have been found to be suitable. The polymer may be melted in a screw extruder; extruded or injected into a billet mould at a temperature about 30° C. above its melting point and cooled under elevated pressure for 5 hours, or it may be melted in an extruder; extruded or injected into a cold billet mould; transferred to an oven for 4 hours under ambient pressure at a temperature below its melting point but above its crystallisation temperature; and thereafter allowed to cool in the oven after the heating has been switched off. The polymer may also be injection moulded into an air or water cooled billet mould. Progressive immersion in the cooling fluid is preferred, thereby ensuring that solidification of the polymer takes place from the bottom of the mould thereby preventing the formation of internal voids due to shrinkage. The hollow workpiece may be formed in the batch by including a mandrel of appropriate cross-section, usually coaxially, in the mould. Alternatively, stock of circular or other hollow cross-section may be produced continuously using one of several processes known to those skilled in the art.

As the hollow workpiece is to be drawn over a former having a cross-sectional area greater than the internal cross-sectional area of the hollow workpiece a belled nose must first be formed on the hollow workpiece to permit start-up. This may be produced by rolling the hollow workpiece onto the former; inflating an elastomeric bag inside the nose region of the hollow workpiece; or drawing a conical former upstream into the nose region of the hollow workpiece.

In performance of the invention a nose formed on the hollow workpiece is advanced to protrude through the die lips and is secured to tensioning means applied from the exit side of the die. A suitable arrangement includes a hauloff comprising a pair of serrated jaws in which the nose is gripped; a high tensile cable one end of which cable is attached to the jaws, the other to a winch or a loading station to which a turning moment or mass may be applied thereby applying a draw tension to the nose. The hauloff may also comprise, instead of a cable, any tension transmitting means used in the metal drawing art including a chain, a rack and pinion mechanism, a screw mechanism and a hydraulically operated draw mechanism. The hauloff may further comprise a pair of continuous contra-rotating friction belts, generally known as a "caterpillar" ("CATERPILLAR" is a registered Trademark.)

The draw tension should be sufficient to draw the hollow workpiece through the die but insufficient to cause tensile failure of the article; that is, the draw tension should be such that the true stress at any point of the product does not exceed its fracture stress at that point. A suitable maximum value of draw tension may readily be determined by routine experiment. In the case of strain hardening polymers, as the drawing progresses the flow stress of the strained portions of the workpiece increases. This will permit a greater draw tension to be applied (giving an increased plastic strain). This enables greater cross-sections of workpiece, or smaller apertures of die, or both, to be utilised also giving a further increase in plastic strain. These increases further strengthen the strained polymer so that the strain can be progressively increased during start-up until a product having desired final properties (for example, Young's modulus or cross-sectional area) is attained whereafter steady state processing conditions obtain.

After a grippable length of the hollow workpiece has been drawn through the die any unsuitably oriented part of its nose may be removed and the oriented grippable length re-gripped thereby enabling a higher load to be applied.

For a particular polymer, a steady state process is obtained for a given set of temperature, draw speed and deformation ratio. "Deformation ratio" as used herein is the ratio of the initial cross-sectional area of the hollow workpiece to the final cross-sectional area of the product. These parameters vary implicitly, but it has been found possible, for a particular polymer, to set the die temperature (which will be only a nominal temperature for the polymer since the process is not an isothermal one) and the workpiece shape and vary, by experiment, the draw speed to obtain the desired deformation ratio.

For linear homo- and copolymers of ethylene the hollow workpiece is desirably heated to a temperature within 60° C. below the melting point of the polymer. More particularly, for such polymers of $\overline{M}_w$ from 50,000 to 150,000, the temperature is preferably from 70° C. to 100° C.; and for such polymers of $\overline{M}_w$ above 300,000 from 70° C. to 120° C. For linear homo- and copolymers of polypropylene of weight average molecular weight from 150,000 to 800,000 the hollow workpiece is desirably heated to a temperature from 20° C. to 170° C., preferably 90° C. to 130° C. A temperature of 80° C. to 170 ° C. preferably 150° C. to 170° C. is suitable for homo- or copolyoxymethylene; of 80° C. to 165° C. is suitable for vinylidene fluoride polymers and of 55° C. to 110° C. or even 55° C. to 120° C. is suitable for polyester. The polymer temperature may be further controlled by utilising a heated die and/or a temperature controlled chamber which extends downstream. Certain polymers may also be heated by subjecting them to a dielectric field, as disclosed in EPC No. 0084274 and U.S. Pat. No. 3,364,294.

Very clear oriented, polyester material may be prepared by the process of the invention by heating an orientable thermoplastic workpiece of the polyester material to a temperature from 55° C. to 105° C., preferably from 60° C. to 90° C., at the entry side of the reducing die; and deforming the workpiece by passage through the die in the solid phase at a nominal deformation ratio of at least 2:1, preferably of at least 3:1.

If a measure of clarity may be sacrificed the workpiece may be heated above 105° C.; for example to 110° C. or even to 115° C. above which temperature the resulting product is both cloudy and of diminished modulus.

It is feasible to use draw speeds greater than 1 cm min$^{-1}$ in the die drawing process of this invention; indeed, speeds of 50 cm min$^{-1}$ or more are preferred.

A batch process may be converted to a continous one by putting the upstream end of the deforming hollow workpiece and the downstream end of stock of the same cross-sectional both in contact with a hot, stainless steel plate; removing the plate and welding the two polymer surfaces. Preferably such a weld should be at an angle of 45° or less to the axis of the stock.

Utilising the die drawing process of this invention on polymers which show adequate strain hardening and strain rate dependence of the flow stress, it is possible to obtain deformation ratios of at least 4, preferably 10 or even more.

Deformation ratios readily attainable by the process of this invention are 4:1 (PEEK); 4:1 to 6:1 (PET, PVDF and polyamide); 7:1 to 9:1 (POM); and 8:1 to 12:1 (polyolefins).

BRIEF DESCRIPTION OF THE DRAWINGS

The invention will now be further described, by way of example, with reference to the accompanying drawings in which.

Figure 1:
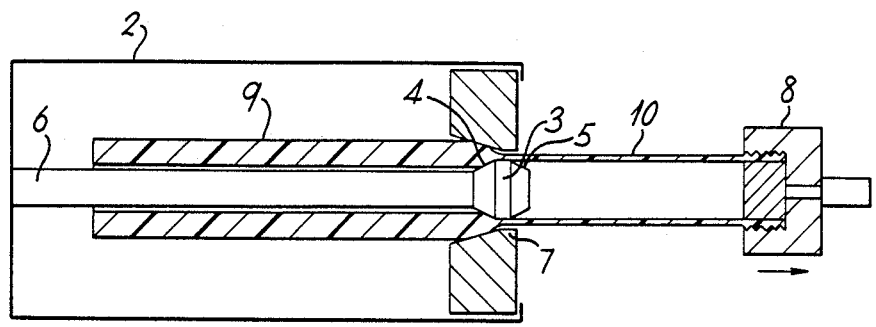
FIG. 1 represents a schematic side elevation of the apparatus diametrically sectioned along the machine direction.
Figure 2:
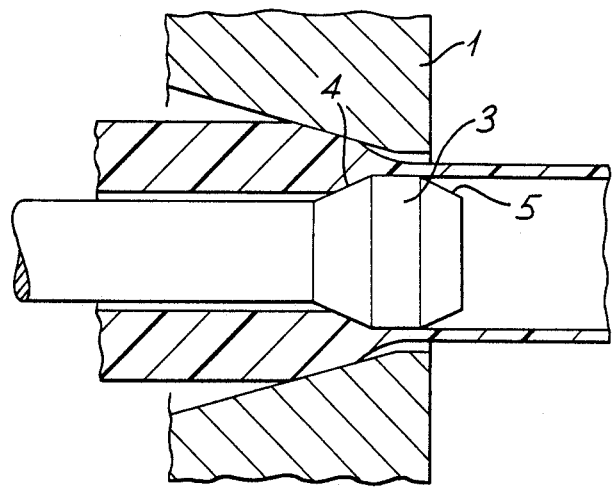
FIG. 2 represents a detailed side elevation of the die geometry in which at least a portion of the die bore is convergent.
Figure 3:
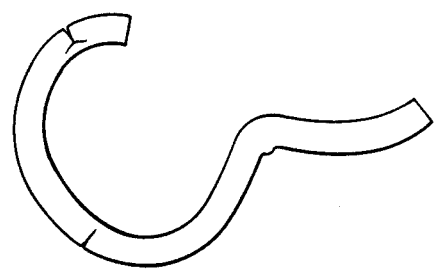
FIG. 3 represents a hoop prepared and deformed as described in the Example.

In the drawing, the apparatus consists of a reducing die 1 of 15° semi-angle and maximum reduction (or ideal deformation) ratio of 2.68 and, upstream thereof, an oven 2 from which a mandrel 3 (21.8 mm diameter and 10 mm length), having tapered leading and trailing edges 4, 5, is supported by rod 6 (16 mm diameter) in the die exit 7 which is 1 cm in length and without taper. Hauloff jaws 8 are connected downstream from the reducing die to a winch (not shown).

In use, an initial hollow workpiece 9 of orientable thermoplastic polymer is machined at one end to form a nose. It is then inserted over the mandrel and rod into the oven, maintained at a temperature of 100° C., so that the machined end protrudes through the die exit, the die also being maintained at 100° C. The machined end is next gripped in the hauloff jaws and load applied, slowly at first such that the plastic strain of the billet is progressively increased without causing tensile failure. After start-up a steady drawing speed at a steady drawing load is established.

The following Examples illustrate the invention.

EXAMPLE 1

An ethylene copolymer of the following specification:
0.7: —CH═CH$_2$ groups/1000 C atoms
1.4: —CH$_3$ groups/1000 C atoms
$\overline{M}_w$: 205,500
$\overline{M}_n$: 18,000
$\overline{M}_w/\overline{M}_n$: 11.4
(Marlex 47100 ex Phillips; "ARLEX" is a registered Trade Mark) was melt extruded into a billet mould having an internal diameter of 3 inches at 220° C.; and cooled to ambient temperature under elevated pressure for 15 hours to give a void-free billet 700 mm in length.

This billet was then bored-out to 25 mm I.D. and machined externally to 63 mm O.D.; and a nose, 100 mm in length, was then machined on one end of the billet by continously increasing the bore to 40 mm and continously turning down the outer surface to 52 mm O.D., the two frusto-conical surfaces so generated each having a semivertical angle of 7°. The hollow billet so formed was next incorporated into the aforementioned apparatus and heated to 100° C.

After being left for at least 2 hours in the apparatus at the temperature of 100° C. in order to attain thermal equilibrium, the protruding nose of the billet was gripped by a clamp at the exit side of the die and the billet, at an initial temperature of 100° C. was drawn through the die at a speed of 10 mm min$^{31}$ at a tension of about 400 kg wt until sufficient oriented polymer appeared to enable repositioning of the clamp whereupon this process was repeated until drawn material from the bulk of the billet appeared at the exit side of the die. After a final repositioning of the clamp drawing was recommenced at a draw speed of 190 mm min$^{-1}$ at a tension of 1400 kg wt until substantially all of the billet has been drawn to given an oriented ethylene copolymer tube of 40.5 mm O.D. and 32.2. mm I.D. and having an actual deformation ratio of 5.5.

10 mm lengths were cut from the tube to provide hoops; it was found that they could be deformed in a vice in a direction at right angles to the machine direction to a substantial strain in which the vice jaws were only 24 mm apart before fracture of the hoops occured. Even on fracture the hoops remained intact, the cracks not having propagated to the internal surfaces of the hoops.

If a portion of a hoop is deformed instead by application of a net force away from the centre of curvature of the hoop the internal surface of the hoop does not fracture but, rather, undergoes plastic flow.

A more quantitative test is now described which was effected to demonstrate the enhanced ductility of the tubes produced in accordance with the present invention.

A soft rubber bung was inserted into a length of the tube prepared as aforesaid. The bung was then compressed by two pistons mounted to be contra-axially and internally slidable in the tube. A circumferential scale measured the maximum change in girth of the tube prior to rupture. The force applied to the pistons was a measure of the rupture stress generated.

It was found that the tube expanded in girth by 4.6% before breaking at a rupture stress of 30 MPa. A comparison tube of the same polymer prepared as disclosed in GB No. 2060469B expanded in girth by 1.3% before breaking at a rupture stress of 26 MPa. It will be seen, therefore, that the tube of the present invention exhibited a nearly threefold increase in ductility over the tube prepared as disclosed in GB No. 2060469B.

EXAMPLE 2

A length of clear tube of isotropic, amorphous polyethylene terephthalate of 18.5 mm I.D. and 25 mm O.D. (as received ex AKZO) was pre-treated, prior to drawing, in the following way. The tube was mounted as a bung to a high pressure air line. The central portion of the tube was then heated inside a mould by pouring water at 95° C. thereover and, while hot, expanded by admitting air into the tube at 100 p.s.i. With the air pressure maintained the tube was quenched by immersion in a water bath at ambient temperature. The air pressure was next released and the bubble so formed was sawn through at its equator to provide two bell-ended tubular billets.

Figure 4:
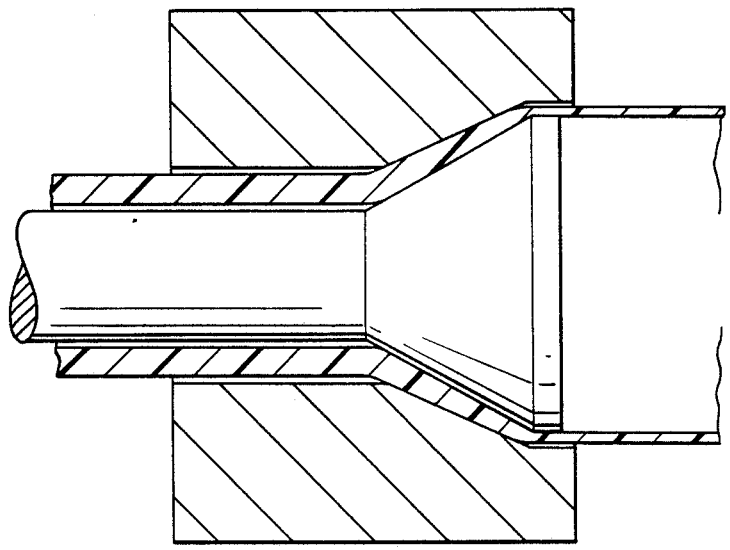
FIG. 4 represents a detailed side elevation of die geometry differing from that of FIG. 2 in that at least a portion of the die bore is divergent.

The billet so formed was then incorporated into the aforementioned apparatus in which the mandrel and die tooling was that shown in FIG. 4 of the accompanying drawings and wherein the frusto-conical portion of the mandrel has a 15° semi-angle expanding from a 18 mm diameter to a 35 mm diameter while the die has a semi-angle of approximately 13°. The billet was heated to 75° C. and maintained for 1 hour at that temperature in order to attain thermal equilibrium.

At low drawing speeds (typically 1 cm min$^{-1}$) noisy stick-slip occurred and the resulting tube had a irregular, rather thick (1.2 mm) wall of 36 mm O.D. However, with higher drawing speeds stick-slip disappeared: at a drawing speed of 30 cm min$^{-1}$ a clear, smooth tube was produced with a 27 mm O.D. If the drawn product was quenched as it left the mandrel it was found that the tube retained a higher O.D.; for example, at a drawing speed of 65 cm min$^{-1}$ clear, smooth tube of 33 mm O.D. and a wall thickness of 0.5 mm was produced.

The drawn product was qualitatively assessed to be very tough and crease-proof. Further drawing of strips cut in the machine direction was not possible at ambient temperature. Circumferential strips could, however, be drawn by approximately 100%.

EXAMPLE 3

A length of unplasticised PVC thick walled tube of 32 mm I.D. and 42 mm O.D. (Polyorc BS 3505 CL7 ex ICI) was pre-treated, prior to drawing, in the following way.

A bell-end was formed at one end of the tube by pulling a metal taper-nosed cylinder of the following configuration: cylindrical nose 32 mm diameter, 30 mm long; then a cone of 15° SVA leading to a cylindrical body of 59 mm, 70 mm long, heated to 150° C., into it. The tube was originally at room temperature but the end to be deformed received heat from the hot cylinder. This softened the tube and allowed the tapered cylinder to be drawn into the tube along a length of 15 cm, thereby expanding the end. The tube was then cooled with the taper in place, after which the taper was removed. (The operation was made easier both by greasing the taper and also by chamfering the leading edge of the tube.)

Figure 5:
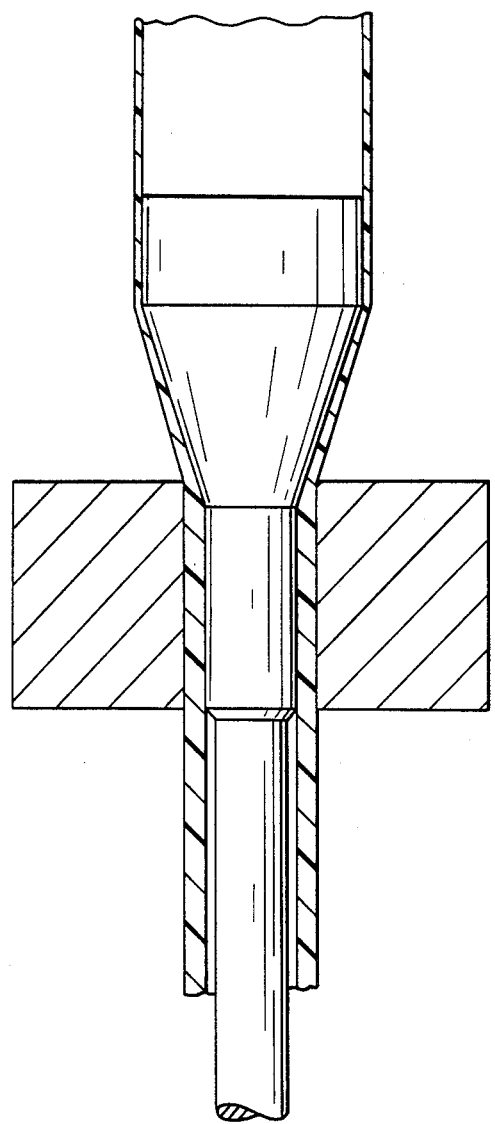
FIG. 5 represents a detailed side elevation of die geometry differing from that of FIG. 2 in that the die bore is constant It is observed that in each of the geometries illustrated in FIGS. 2, 4 and 5 at least a portion of the die-former configuration defines a reducing cross-sectional area for the flow path of the deforming hollow workpiece.

The bell-ended billet so formed was next heated in an oven to 95° C. and drawn through the mandrel and die tooling shown in FIG. 5 of the accompanying drawings and maintained at the same temperature.

The dimensions of the die were: Length 60 mm; Bore diameter 42 mm.

The dimensions of the mandrel were:
Cylindrical neck 32 mm diameter, 60 mm long;
Conical expanding zone 15° SVA leading to; a short cylindrical section 5 mm long, 58 mm diameter.

The mandrel was fitted so that its neck was coaxially within the die and the conically expanded part was substantially outside the die and downstream therefrom but held in position so that a constriction was formed between the downstream end of the die and the upstream end of the expanding cone of the mandrel. The constriction reduced, the tube wall thickness at this point from 5.0 mm to 3.7 mm regulating and controlling the flow of the deforming PVC tube. The mandrel was provided with a hole for a cartridge heater. This heater brought the temperature of the mandrel to 95° C. prior to start up, when it was removed. A soak time of 1–2 hours was allowed for the billet, oven and mandrel to attain equilibrium. The inside of the billet was lightly lubricated with grease.

The expanded end of the billet was then grasped and the billet drawn at a speed of 70 cm/min, the draw force being 350 kg.

The resulting product was a shiny uniform, tough tube 61 mm outside diameter; 55 mm bore diameter.

This corresponds to a hoopwise expansion of 1.6X and a lengthwise extension of 1.05X.

In accordance with a further aspect of this invention, a deformed hollow workpiece of this invention may be further fabricated, for example by slitting and/or rolling into sheet stock.

We claim:

1. A process for the deformation of a hollow workpiece comprising an orientable, thermoplastic polymer by passage in the solid phase through a die having both an entry side and an exit side, which process comprises providing the hollow workpiece at the entry side of the die; applying tension to the hollow workpiece from the exit side of the die where said tension is insufficient to cause tensile failure of the workpiece but sufficient to deform the hollow workpiece; thereby drawing said hollow workpiece with reduction in its bulk cross-sectional area in the solid phase simultaneously through the die and over an internally position former; said former having a cross-sectional area greater than the initial internal cross-sectional area of the hollow workpiece; and collecting the deformed hollow workpiece from the exit side of the die.

2. A process according to claim 1 wherein the polymer comprising the hollow workpiece is a semicrystalline polymer.

3. A process according to claim 2 wherein the polymer is an unsubstituted or mono- or poly halo-substituted vinyl polymer, unsubstituted or hydroxy-substituted polyester, a polyamide or a polyacetal.

4. A process according to claim 3 wherein the polymer is a linear homo- or copolymer of ethylene or propylene with at least one comonomer.

5. A process according to claim 4 wherein the polymer is a linear homo- or copolymer of ethylene of $\overline{M}_w$ from 50,000 to 500,000.

6. A process according to claim 5 wherein the hollow workpiece is heated to a temperature within 60° C. below the melting point of the polymer.

7. A process according to claim 4 wherein the polymer is a linear homo- or copolymer of propylene of $\overline{M}_w$ from 150,000 to 800,000.

8. A process according to claim 7 wherein the hollow workpiece is heated to a temperature from 20° C. to 170° C.

9. A process according to claim 3 wherein the polymer is a polyoxymethylene.

10. A process according to claim 9 wherein the hollow workpiece is heated to a temperature from 80° C. to 170° C.

11. A process according to claim 3 wherein the polymer is a vinylidene fluoride polymer.

12. A process according to claim 11 wherein the hollow workpiece is heated to a temperature from 80° C. to 165° C.

13. A process according to claim 3 wherein the polymer is a polyester.

14. A process according to claim 13 wherein the hollow workpiece is heated to a temperature from 55° C. to 120° C.

15. A process according to claim 1 wherein the hollow workpiece comprises a filler.

16. A process according to claim 1 wherein the hollow workpiece is essentially unoriented before deformation.

17. A process according to claim 1 wherein the hollow workpiece is an open-ended elongate workpiece of substantially constant cross-section.

18. A process according to claim 17 wherein the hollow workpiece has an axis of symmetry.

19. A process according to claim 18 wherein the hollow workpiece has a circular, elliptical, square, rectangular or triangular cross-section.

20. A process according to claim 1 wherein at the die and downstream therefrom there is positioned within the hollow workpiece a former having a cross-sectional area of at least the initial internal cross-sectional area of the hollow workpiece.

21. A process according to claim 1 wherein the die is heated.

22. A process according to claim 1 wherein the oriented thermoplastic material passes through a heated chamber downstream from the die.

23. A process according to claim 1 wherein the hollow workpiece is drawn through the die in the solid phase at a nominal deformation ratio of at least 3:1.

24. A process according to claim 23 wherein the draw speed is greater than 50 cm min$^{-1}$.

25. A process according to claim 23 which is continuous.

* * * * *